United States Patent [19]

Gallup et al.

[11] Patent Number: 4,615,808

[45] Date of Patent: * Oct. 7, 1986

[54] ACIDIFICATION OF STEAM CONDENSATE FOR INCOMPATIBILITY CONTROL DURING MIXING WITH GEOTHERMAL BRINE

[75] Inventors: Darrell L. Gallup, Ontario; John L. Featherstone, El Centro, both of Calif.

[73] Assignees: Union Oil Co. of California, Los Angeles; Mono Power Co., Rosemead; Southern Pacific Land Co., San Francisco, all of Calif.

[*] Notice: The portion of the term of this patent subsequent to Nov. 12, 2002 has been disclaimed.

[21] Appl. No.: 709,643

[22] Filed: Mar. 8, 1985

Related U.S. Application Data

[63] Continuation-in-part of Ser. No. 567,254, Dec. 30, 1983, Pat. No. 4,522,728.

[51] Int. Cl.[4] ............................................. C02F 1/52
[52] U.S. Cl. .................................... 210/714; 210/718; 210/747; 210/790; 60/641.5
[58] Field of Search ............... 210/696, 714, 718, 724, 210/737, 747, 750, 774, 790; 60/641.3, 641.5

[56] References Cited

U.S. PATENT DOCUMENTS

| | | | |
|---|---|---|---|
| 3,262,865 | 7/1966 | Waters | 203/7 |
| 3,627,479 | 12/1971 | Yee | 210/718 X |
| 3,775,312 | 11/1973 | Merchant | 210/51 |
| 3,862,545 | 1/1975 | Ellis et al. | 60/641 |
| 4,038,365 | 7/1977 | Patil et al. | 210/75 X |
| 4,148,360 | 4/1979 | Watanabe | 166/300 |
| 4,203,492 | 5/1980 | Watamabe | 166/300 |
| 4,259,300 | 3/1981 | Lieffers | 60/641 X |
| 4,370,858 | 2/1983 | Awerbach et al. | 210/714 X |
| 4,405,463 | 4/1983 | Jost et al. | 210/747 X |
| 4,429,535 | 2/1984 | Featherstane | 210/714 X |

OTHER PUBLICATIONS

Featherstone et al. "Stabilization of Highly Saline Geothermal Brine," Soc. of Pet. Eng. AIME, No. SPE8369 (1979).

Tardiff, "Using Salton Sea Geothermal Brines for Electrical Power," Lawrence Livermore Lab., Preprint No. UCRL-79468, 5/1977.

Kestin, "Sourcebook on the Production of Electricity from Geothermal Energy," Brown University, Pub. #DOE/RA/4051-1, Chap. 4, P. 536.

*Primary Examiner*—Thomas Wyse
*Attorney, Agent, or Firm*—Howard R. Lambert; Walter A. Hackler

[57] ABSTRACT

A method is provided for combining a high pH steam condensate with a flow of a acidic geothermal brine from which the steam is extracted so as to inhibit the formation of suspended particulate matter, such as heavy metal sulfides, calcium carbonate and iron hydroxide, by the chemical reacting of such impurities as hydrogen sulfide and ammonia in the condensate with such impurities as heavy metals, iron and calcium in the brine. The method includes acidifying the steam condensate, preferably by hydrochloric acid, to reduce the pH to between about 7 and about 4.5 and then combining the acidified condensate with the brine. In a silica crystallizer stage in which flashed brine is contacted with a silica seed material to cause silica removal from the brine, the treated condensate is combined with the brine in a low pressure crystallizer upstream of brine clarification and reinjection stages. Part of the treated condensate may be flowed to various pumps in the geothermal brine power production system to purge pump seals and prevent pump scaling and excessive wear.

21 Claims, 2 Drawing Figures

ACIDIFICATION OF STEAM CONDENSATE FOR INCOMPATIBILITY CONTROL DURING MIXING WITH GEOTHERMAL BRINE

BACKGROUND OF THE INVENTION

This is a continuation-in-part of U.S. patent application Ser. No. 567,254, filed Dec. 30, 1983, U.S. Pat. No. 4,522,728.

FIELD OF THE INVENTION

The present invention relates generally to processes for generating electrical power by use of hot geothermal aqueous liquids and more particularly to processes for controlling the formation of scale in geothermal brine power plants and associated brine injection equipment.

DISCUSSION OF THE PRIOR ART

Large subterranean reservoirs of naturally occurring steam and/or hot aqueous liquids (water or brine) have been found in many regions of the world. Such geothermal reservoirs are especially prevalent where the thermal gradient near the earth's surface is abnormally high, as in regions of volcanic, geyser or fumarole activity, as is commonly found along the rim of the Pacific Ocean.

In some regions, where relatively abundant and readily accessible, hot geothermal fluids have, for some time, been used for therapeutic treatment of bodily disorders, in industrial processes, for heating purposes and the like. Although effort in further developing geothermal resources for such purposes continues, substantial effort has recently been directed towards using geothermal fluids to generate electric power which is usually much less site-restricted than is the more direct use of geothermal fluids for the above mentioned purposes. These interests in geothermal resources for power generation have been heightened by recent steep increases in petroleum and natural gas costs, as well as by the actual or threatened shortages of such fuels.

The general processes for using hot geothermal fluids to generate electric power are quite well known. For example, geothermal steam can, after treatment to remove particulate material and polluting gases, be used in the manner of boiler-generated steam to drive conventional steam turbine-generators. Naturally pressurized, high temperature (above about 400° F.) geothermal water or brine is typically flashed to a reduced pressure to release steam which is used to drive steam turbine-generators. Lower temperature geothermal liquids are, in contrast, generally useful in binary fluid systems in which a low boiling point working fluid is vaporized by the hot geothermal liquid and the vapor is used to drive gas turbine-generators.

As can be appreciated, geothermal steam is preferred over geothermal liquids for the production of electric power because the steam can be used almost as extracted from the earth in generally conventional steam-turbine power plants. As a result, where abundantly available and favorably located, as at The Geysers in California, geothermal steam has been used for a number of years to generate substantial amounts of electric power at competitive costs. Unfortunately, however, abundant sources of geothermal steam are relatively scarce, and at current estimates are only about one-fifth as prevalent as good sources of geothermal aqueous liquids.

Because of the maturity of geothermal steam power generating processes and the scarcity of large grothermal steam sources, much of the current development effort in the geothermal field is directed towards developing commercially viable geothermal water/brine power generating facilities; particularly in such regions as the Imperial Valley in Southern California, where there is an abundance of geothermal brine.

General processes and techniques for using geothermal aqueous liquid to generate electric power are, as above-mentioned, known. Such processes and techniques are, in theory, relatively straight forward. However, in actual practice many serious problems are usually encountered in handling the geothermal aqueous liquids, particularly the brines. Geothermal aqueous liquids typically have wellhead temperatures of several hundred degrees Farenheit and pressures of several hundred p.s.i.g. and are typically heavily contaminated with dissolved materials. For example, in many regions, the geothermal aqueous liquids contain high levels of dissolved gases, such as hydrogen sulfide, carbon dioxide, and ammonia, as well as high levels of metals, such as, lead, iron, arsenic, and cadmium. In addition, many hot geothermal aqueous liquids are saturated with silica and many are also highly saline in nature, being therefore termed brines.

Because of their high levels of contaminants and high wellhead temperatures, most geothermal aqueous liquids are not only corrosive to equipment and have scale forming characteristics, but the reduced-energy, geothermal effluent discharged from the power generating facility cannot be easily disposed of, particularly considering that flow rates in excess of one million pounds per hour are not uncommon. Effluent contaminants, such as lead and arsenic, preclude safe use of the discharged liquid for such otherwise potential uses as crop irrigation, and in most localities discharging of the effluent into rivers, lakes and other water supplies is prohibited. Ponding and evaporation of the discharged geothermal effluent is generally impractical because of the large volumes involved. Moreover, because of their typical heavy metal content, the evaporated residues may be considered hazardous or toxic wastes and disposal is accordingly costly.

The most, and often the only, practical manner of disposing of the geothermal effluent is, therefore, by pumping it back into the ground through injection wells. Additional advantages of this method of disposal are that ground subsidence which might otherwise be caused by depletion of underground geothermal reservoirs is eliminated, and useful life of the underground reservoirs is usually increased.

Although reinjection often provides the only feasible method for disposing of geothermal effluent, serious problems, usually related to high silica content of the geothermal liquid, are nevertheless associated with such disposal. As mentioned, in many locations, the hot pressurized geothermal liquid, as extracted, is saturated with silica. When the geothermal liquid is flashed to produce steam for power production, the pressure of the liquid is reduced and the liquid becomes supersaturated with silica. As a result, silica rapidly precipitates from the liquid to form a hard scale on downstream piping and injection equipment, including the injection wells themselves. With many geothermal aqueous liquids, a silica scale formation rate of several inches per month is not unusual. As scaling of the piping, equipment and injection wells builds up, the geothermal liquid flow through the system becomes choked off and facility shutdown is then necessary for system reconditioning, which may include costly reboring of the injection wells. Because the silica scale is ordinarily very hard and tough, and clings tenaciously to equipment, the renovation process is difficult, time-consuming and costly, both in terms of actual renovation costs and in terms of nonproductive facility downtime.

Two general methods are typically used to minimize the silica scaling problems in geothermal liquid power producing facilities. One method is to treat or handle the geothermal liquid in such a manner as to keep the silica in solution through reinjection. The other method is to cause sufficient silica precipitation from the geothermal liquid, in a controlled manner and in specific facility stages from which the precipitated silica can be easily removed, to keep the silica level below saturation during the reinjection stage.

As can be appreciated, when the geothermal aqueous liquid is saturated with silica at wellhead temperatures and pressures, it is very difficult to keep the silica in solution when the liquid temperature and pressure is substantially reduced during the energy extraction process. The silica scale preventing method of controlled removal of sufficient silica so that the silica saturation level is not exceeded during the energy extraction process, although not without problems, may, therefore, be preferred in many instances where silica scaling would otherwise be a problem.

One of the greatest difficulties with silica removal processes is the removal of the right amount of silica at the right stage in the system. If an insufficient amount of silica is removed, silica scaling will not be prevented and if the silica is not precipitated where intended, the precipitate may carry over into other stages of the system and cause flow restriction problems. On the other hand, excessive removal of silica may overload the silica disposal stages and add to the silica waste disposal costs. Therefore, to assure a practical and relatively trouble-free system, the silica removal process must be carefully controlled.

With respect to the silica removal process, seeding of the geothermal aqueous liquid with a seed material, onto which the silica in solution crystallizes, appears to offer advantages of rapid, and hence location-controlled, silica removal. Such seeding processes typically pump some of the silica precipitate removed from one stage of the system into the flow of geothermal aqueous liquid at an upstream point, typically a flash-crystallizing stage which may be comprised of one or more flash-crystallization vessels. As the flashed geothermal liquid is contacted with the silica seed material in the flash crystallization stage, silica crystallizes from the liquid onto the seed material; the resulting precipitate is then removed, for example, in a downstream reactor-clarifier stage.

Problems have heretofore, however, been associated with disposing of the large flow of high pH steam condensate which results from using the steam extracted from the geothermal aqueous liquid. Typically the flow of condensate is about 10 percent of the flow of flashed geothermal liquid and may accordingly be as great as several hundred thousands pounds per hour. Although the steam extracted from the geothermal aqueous liquid by the flashing process is generally much less contaminated than the geothermal liquid, it usually has enough contaminants, notably boron and arsenic, which are carried over into the steam to cause the steam condensate to be unusable and, as in the case of geothermal liquid, the most practical disposal method for the condensate is reinjection. Therefore, the basic steam condensate is ordinarily recombined with the acidic, flashed geothermal liquid upstream of the injection stage. The steam condensate may also contain appreciable levels of dissolved hydrogen sulfide, hydroxides (such as ammonium hydroxide) and carbonates all of which tend to be suppressed or maintained in solution by the normally high condensate pH.

The present inventors have, however, discovered that because of the substantial differences in the chemical composition and also the pHs of the steam condensate and the flashed geothermal aqueous liquid, combining of the steam condensate with the flashed geothermal liquid upsets the chemical equilibrium in the liquid, thereby disrupting the silica crystallization process. Moreover, it has been found that such recombination also results in the formation of fine particulate matter, for example, heavy metal sulfides, carbonates, and/or hydroxides, when heavy metal impurities in the brine combine with the sulfides, hydroxides and carbonates in the condensate. Most of the particulate matter formed tends to remain in suspension and subsequently clogs up media filters through which the combined geothermal liquid and steam condensate are passed before reinjection. However, some of the particulate matter precipitates, and equipment scaling has been discovered to occur in regions of condensate-flashed liquid recombination.

It is, therefore, an object of the present invention to provide a method for combining high pH steam condensate with an acidic, flashed, silica-rich geothermal aqueous liquid in a silica precipitating-type of system so as to prevent the formation of unwanted, suspended particulate matter.

A further object of the present invention is to provide a method of combining, in a silica crystallization stage, a flow of high pH steam condensate with a flow of acidic, silica-rich, geothermal aqueous liquid, in which the pH of the steam condensate is adjusted so as to optimize the silica precipitation in the silica crystallization stage.

A still further object of the present invention of to provide a method for combining a flow of high pH steam condensate with a flow of hot, acidic geothermal aqueous liquid containing heavy metals in solution, which substantially reduces the formation of suspended heavy metal compounds.

Still another object of the present invention is to provide a method for combining a flow of high pH steam condensate with a flow of hot, acidic geothermal aqueous liquid in which at least part of the steam condensate is used as a pump seal purge for pumps used in the system.

Additional objects, advantages and features of the invention will become apparent to those skilled in the art from the following description, when taken in conjunction with the accompanying drawing.

SUMMARY OF THE INVENTION

In accordance with the present invention, a method is provided for combining condensate of geothermally derived steam with a flow of geothermal liquid containing water and impurities, the geothermal liquid having an acidic pH, the condensate having a basic pH and containing water and volatile impurities, the geothermal liquid and condensate being such that, if combined without treatment, suspended particulate matter would form in the resultant mixture, the method comprising reducing the formation of the suspended particulate matter by treating the flow of steam condensate so as to reduce the pH thereof to a level of no more than about 7 and preferably to a level of between about 7 and about 4.5. The flow of reduced pH steam condensate is then combined with the flow of geothermal liquid upstream of an injection stage which injects the combined flow of condensate and geothermal liquid into the ground.

As a result, the formation of suspended particulate matter, which could otherwise cause clogging of such geothermal treating equipment as media filters, is substantially prevented, as is localized scaling of equipment in the region of condensate-geothermal liquid combination.

Treating of the flow of steam condensate preferably comprises contacting the condensate with an acidifying agent. More preferably, the acidifying agent is selected from the group consisting of hydrochloric acid, acetic acid and acetic acid derivatives. Most preferably, the acidifying agent used is hydrochloric acid because of its good condensate acidifying characteristics, ready availability and relatively low cost.

In an exemplary system for handling silica-rich geothermal liquid, silica is removed in a flash crystallization stage in which the geothermal liquid is flashed to extract steam therefrom, and in which silica seed material is introduced. Silica then crystallizes from solution in the geothermal liquid onto the seed material for removal from the system. According to the present invention, the flow of reduced pH steam condensate is combined with the flashed geothermal liquid in such flash-crystallization stage of the system.

Also, according to the present invention, some of the reduced pH steam condensate may be diverted to various of the fluid pumps used in the system for purging the pump seals, the steam condensate so used being thereby combined in the pumps with geothermal liquid being pumped thereby.

Silica particle size in the seed crystallization process has been found also affected by pH of the steam condensate. Within the adjusted pH range of steam condensate which is preferred, that is, between about 7 and about 4.5, the present method may thus also provide for adjusting the pH level in response to monitoring the mean size of particles produced in the flash-crystallization stage. The steam condensate pH is lowered, by increased acidification thereof, to increase the mean particle size and is maintained at, or increased, by reduced acidization to decrease mean particle size. Preferably, the steam condensate pH is adjusted to provide a mean particle size of between about 9 and 15 microns. The present method therefore also enables "fine tuning" of the silica removal process.

BRIEF DESCRIPTION OF THE DRAWING

The present invention will be more readily understood by reference to the accompanying drawing which depicts an exemplary hot geothermal brine power generally facility or system in which the present steam condensate treating method may be used to advantage, FIG. 1A showing a part of the system and
FIG. 1B showing the rest of the system.

DESCRIPTION OF THE PREFERRED EMBODIMENT

Figure 1A:
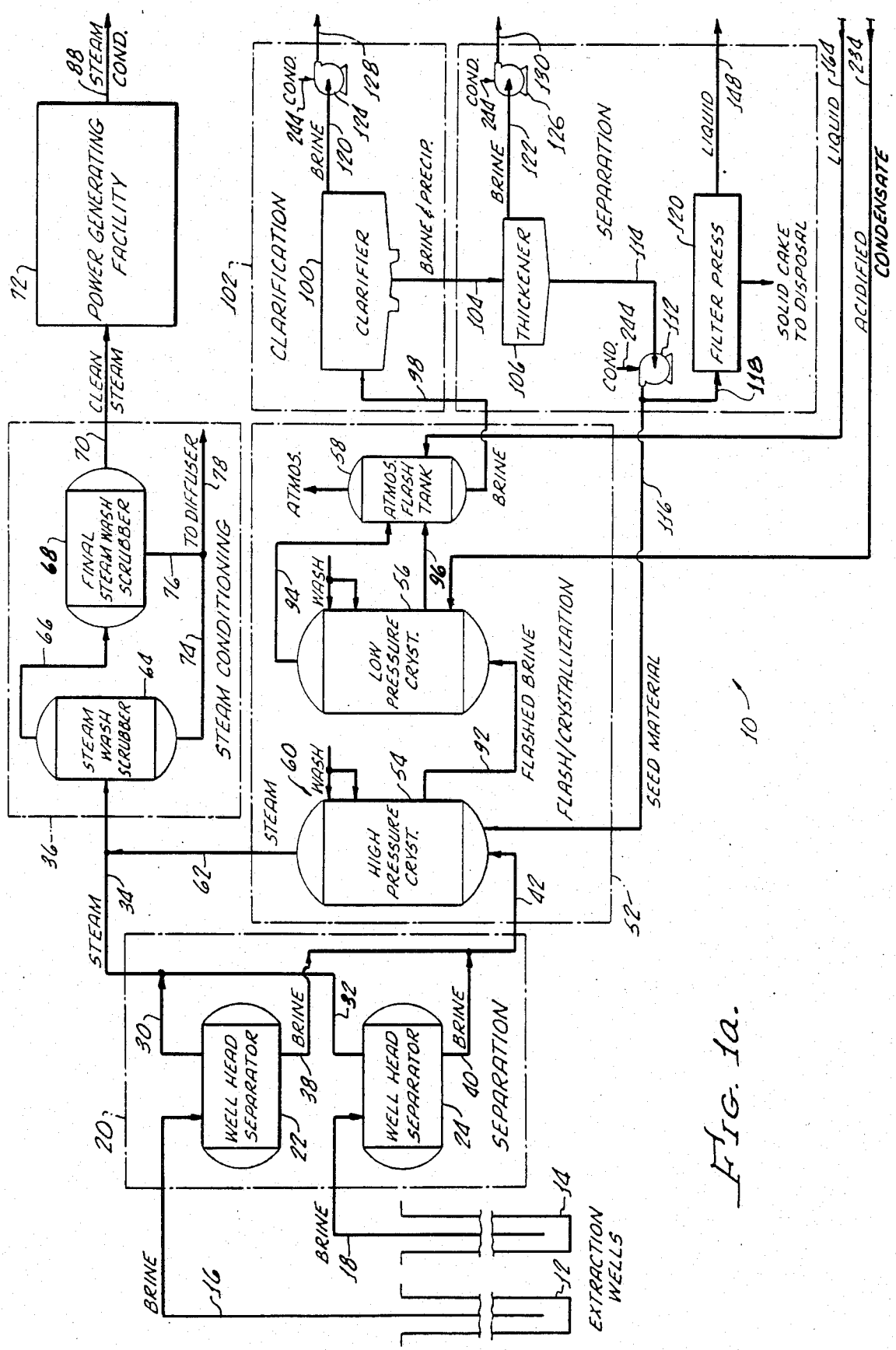
Figure 10:
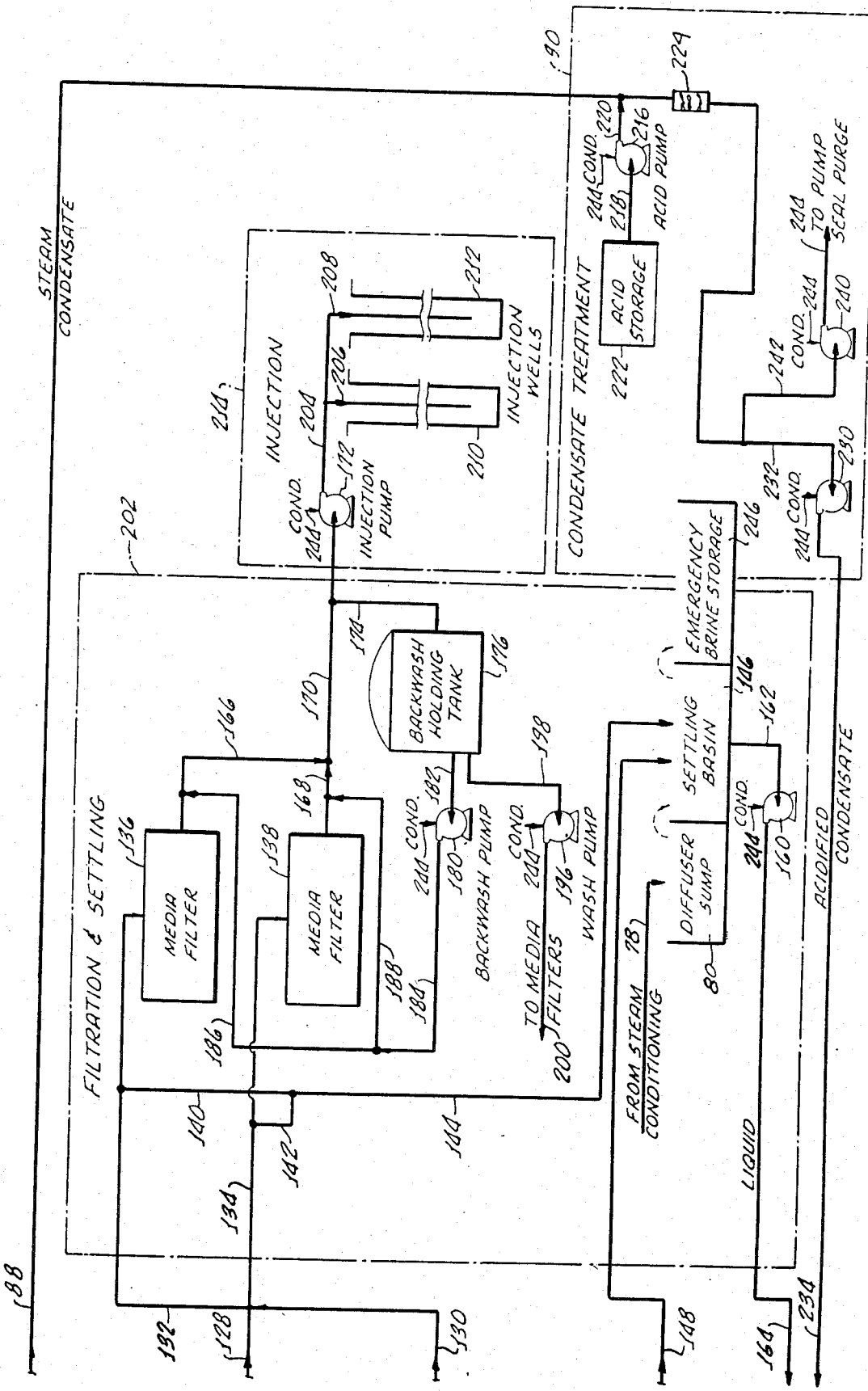

The present steam condensate treatment method is especially directed toward the acidizing of a flow of condensate of steam extracted in a hot geothermal brine power generating facility or system, and the subsequent combining of the acidized steam condensate with the geothermal brine for reinjection of the combined liquids into the earth through injection wells. As more particularly described below, the method is particularly adapted for use in a system in which a seed crystallization process is used to induce controlled precipitation of silica from silica-rich brine after steam, used for power generation, is flashed from the brine. Such controlled silica precipitation and removal is intended to greatly reduce or substantially eliminate silica scaling in system piping, equipment and injection wells.

An exemplary hot geothermal aqueous liquid (for example, brine) electric power generating facility or system 10, in which the present method may be practiced to advantage, is depicted in the drawing, a description of system 10 being helpful to an understanding of the method.

Hot, pressurized, saline geothermal aqueous liquid, hereinafter, for convenience, referred to as "geothermal brine" or "brine", is provided to system 10 from first and second extraction wells 12 and 14 respectively. It is to be appreciated that although only two wells 12 and 14 have been depicted in the Figure, a number of other wells may also be used to provide, for example, a total brine flow of about 1.2 million pounds per hour for a 10 megawatt power output from system 10. At the wellhead, geothermal brine may have a temperature of about 500° F. and a natural pressure of about 450 psig.

From wells 12 and 14, the extracted brine, which typically contains rubble, including sand and rock, is fed through respective conduits 16 and 18 to a separation stage 20. Included in separation stage 20 are first and second wellhead separation vessels 22 and 24, to which conduits 16 and 18 are respectively connected. Within separation vessels 22 and 24 some dissolved steam escapes from the brine, being fed by respective separate conduits 30 and 32 to a common conduit 34 which, in turn, feeds the steam to a steam conditioning stage 36, described below.

Brine is discharged from separators 22 and 24 through respective conduits 38 and 40 to a common brine conduit 42 which, in turn, feeds the brine to a flash crystallization stage 52.

Comprising flash crystallization stage 52 are high pressure flash crystallizer 54, low pressure crystallizer 56 and atmosphere flash tank 58. Brine conduit 42 feeds high temperature, high pressure geothermal brine into the bottom of high pressure crystallizer 54 which is operated at a pressure of about 100 p.s.i.g. so as to enable flashing of dissolved steam from the brine.

Within crystallizer 54, steam washing means 60 are provided for washing the extracted steam before the steam is fed through a steam conduit 62 to combine with separator steam in conduit 34.

Although steam from separating stage 20 and flash crystallizer 54 is relatively low in impurities, as compared with the geothermal brine, a number of impurities dissolved in the brine are usually carried over into the flow of steam. These typically include ammonia, (in the form of ammonium hydroxide) carbon dioxide (in the form of carbonates), and hydrogen sulfide. Amounts of such other contaminants, notably boron, are also typically carried over from the brine into the flow of steam.

Within steam conditioning stage 36, steam is fed through conduit 34 into a preliminary steam wash scrubber 64. Steam from scrubber 64 is then fed by a conduit 66 to a final wash scrubber 68. Washed steam from final scrubber 68 is flowed through conduit 70 to a power generating facility 72 in which the flow of steam is used to generate electric power by generally conventional steam turbine-electric generator apparatus (not shown). Water from scrubbers 64 and 68 is fed through conduits 74 and 76, respectively, to a common discharge conduit 78 through which the water is fed to a diffuser sump 80 for subsequent disposal, as described below.

Within power generating facility 72, energy is extracted from the steam flow from conduit 70 so that the steam condenses. The flow of steam condensate, which may, for a total brine extraction rate of about 1.2 million pounds per hour, be about 155,000 pounds per hour, is discharged through a condensate conduit 88 to a condensate treatment stage 90, described below. As above-mentioned, the steam condensate is ordinarily too contaminated, with such materials as boron, to be usable and the most practical disposal is by reinjection into the ground with the "used" (flashed) geothermal brine.

Within flash crystallizing stage 52, flashed brine from high pressure flash crystallizer 54 is fed through a conduit 92, to low pressure flash crystallizer 56, which may be maintained at a pressure between atmospheric and about 30 p.s.i.g. Some additional steam is flashed from the brine in low pressure flash crystallizer 56. As shown in the drawing, the steam extracted in crystallizer 56 is fed through a conduit 94 to atmospheric flash tank 58 from which it is discharged into the atmosphere. It is to be appreciated, however, that the steam from low pressure flash crystallizer contains substantial energy and so may be used for such purposes as additional power generation in a binary fluid system (not shown), for heating or for other energy-related purposes. In such cases, additional steam condensate, requiring disposal in the manner described herein, might be produced.

Brine and silica precipitate from crystallizer 56 is flowed through a conduit 96 to atmospheric flash tank 58, and from such tank, through a conduit 98, to a large clarifier vessel 100 which forms part of a clarification/separation stage 102.

Silica precipitate, formed in flash crystallizers 54 and 56 and continuing to form in clarifier 100, is separated from the geothermal brine in the clarifier, the wet precipitate being discharged from the bottom of the clarifier via a conduit 104. The wet silica precipitate, which also contains impurities such as lead, zinc, arsenic and other metals carried along with the precipitating silica, is flowed through conduit 104 to a thickener vessel 106 which also forms part of clarification and separation stage 102.

Silica seed material for the silica crystallization process in flash crystallization stage 52 is withdrawn by a pump 112, through a conduit 114, from the bottom of thickener vessel 106. Pump 112 feeds the seed material through a conduit 116 to high pressure flash crystallizer 54 in which a counterflow of seed material and geothermal brine enhances silica crystallization from the brine onto the seed material.

A major portion of the silica precipitate discharged from thickener vessel 106 is fed (controlled by valves, not shown) by pump 112 through a conduit 118 into a filter press 120. Solid cake precipitate is removed from filter press 120 for disposal.

Clarified geothermal brine is discharged from clarifier 100 and thickener vessel 106 through brine conduits 120 and 122, respectively, to respective brine pumps 124 and 126. Such pumps 124 and 126 pump the brine, through conduits 128 and 130, respectively, to common conduits 132 and 134, which discharge into first and second media filters 136 and 138. Filter bypass conduits 140 and 142, connected respectively to brine conduits 132 and 134, enable bypassing of media filters 136 and 138 (by use of valves, not shown). Bypass conduits 140 and 142 are connected to a common conduit 144 which discharges brine into a settling basin 146. Brine from filter press 120 is also fed, through a conduit 148, to settling basin 146. From settling basin 146, brine is recycled, by a pump 160, through conduits 162 and 164 back to atmospheric flash tank 58.

Clarified brine is discharged from media filters 136 and 138 through respective conduits 166 and 168 to a common conduit 170 which is, in turn, connected to an injection pump 172. A conduit 174 is connected between conduit 170 and a backwash holding tank 176.

A pump 180, connected to holding tank 176 by a conduit 182, enables the pumping of filtered brine, through conduits 184, 186 and 188, to media discharge conduits 166 and 168, to enable back flashing of media filters 136 and 138. Flow of brine for such purpose is controlled by various valves, not shown.

An additional pump 196, connected to holding tank 176 by a conduit 198, is provided for recirculating, by a conduit 200, filtered brine back through media filters 136 and 138.

Filters 136 and 138, holding tank 176, pumps 160, 180, and 196, diffuser sump 80 and settling basin 146 form a filtration and settling stage 202.

Filtered brine is pumped by injection pump 172 through conduits 204, 206, and 208, into first and second injection wells 210 and 212 respectively, such wells and pump forming an injection stage 214.

CONDENSATE TREATMENT STAGE 90

In condensate treatment stage 90, steam condensate received via conduit 88 from power generating facility 72 is treated prior to recombining with flashed brine in low pressure flash crystallizer 56 and/or for other use, as described below. The untreated steam condensate flowing through conduit 88 into stage 90 has, due to dissolved impurities, a basic pH which is typically about 9 or 10. Impurities dissolved in the untreated condensate typically include ammonia, principally as ammonia hydroxide, carbon dioxide, principally in the form of various carbonates, and hydrogen sulfide. Such impurities are carried over into the steam from the brine from which the steam is produced. At a condensate pH level of 9 or 10, the ammonia reacts with the hydrogen sulfide and carbon dioxide in a manner suppressing their outgassing.

As above-described, the flashed brine contains appreciable levels of impurities including heavy metals, iron, and calcium compounds. When untreated, condensate is combined with the flashed brine, for example, in low pressure flash crystallizer 56, such impurities in the brine react with the above-mentioned impurities in the untreated condensate to form insoluble materials which principally include heavy metal sulfides, calcium carbonate, iron hydroxide and lead hydrochloride. By insoluble it is meant that the formed materials remain substantially undissolved in the mixed condensate brine flow through subsequent reinjection; although, given sufficient contact time most of the material would eventually be dissolved.

Typically the insoluble materials resulting from the combination of the untreated, basic condensate and the acidic brine are in the form of very small particles, typically less than about 0.5 microns in size, which tend to remain in suspension. As a result, these small particles flow through clarifier 100 and are discharged therefrom into media filters 136 and 138 which collect many of the particles and become increasingly clogged thereby. Some of the particles, however, pass through filters 136 and 138 and are deposited in injection wells 210 and 212, causing eventual clogging thereof.

Moreover, the lead hydrochloride so formed has been found to be corrosive to the metal brine handling equipment, including piping, vessels and fittings, into which it comes into contact.

The extent to which the above-described insoluble materials are formed depends not only upon the amount of related impurities in the condensate and brine, but also upon the localized pH where the condensate is introduced into the brine. With respect to the latter factor, it has been discovered that reactions resulting in the formation of the insoluble material proceed rapidly when the pH of the brine is raised much above its normal level of about 5-5.5. Such brine pH elevation is caused in the region of introduction when appreciable amounts of basic condensate are introduced into the brine flow. Accordingly, when a flow of basic condensate is introduced into or merged with a flow of acidic brine, brine pH is locally increased and a continual flow of insoluble materials is formed.

As described in our above-cited copending application Ser. No. 567,254, when the untreated condensate is acidified to provide closer pH matching with the brine, the hydrogen sulfide and carbon dioxide impurities in the condensate become "untied". An acidified condensate outgassing step is then provided, for example, by flowing the acidified condensate into and through an open pond or tank, so that some of the hydrogen sulfide and carbon dioxide can outgas. As a result, there remains less hydrogen sulfide and carbon dioxide in the acidized condensate to combine with impurities in the brine.

In some circumstances, such outgassing of the acidified condensate may be impractical, undesirable or not allowed for environmental reasons. Moreover, it has been found by the present inventors, that much, although usually not all, of the benefits provided by acidizing the condensate and then allowing the condensate to outgas before combining with the acid brine can be obtained by directly combining the acidized condensate with the brine without first outgassing the acidified condensate.

In accordance therewith, in present condensate treatment stage 90, an acidifying agent (described below), is fed by a pump 216 through conduits 218 and 220, from a storage tank 222 into the flow of steam condensate in conduit 88. A conventional mixer 224 may be installed in conduit 88 just downstream of the connection between acidifying agent conduit 220 and condensate conduit 88 to provide rapid, thorough intermixing of the acidifying agent and the condensate.

Downstream of mixer 224, condensate conduit 88 is connected to a condensate pump 230 through a conduit 232. Pump 230 pumps the acidified condensate through a conduit 234 into low pressure flash crystallizer, wherein the discharged condensate is combined with flashed brine.

A second condensate pump 240 may be connected, by a conduit 242, to condensate conduit 88 downstream of mixer 224 for pumping a small amount of condensate, for example, about 200 pounds per hour, through a conduit 244 to seal regions of pumps 112, 124, 126, 160, 172, 180, 196, 216, 230 and 240, as well as other pumps (not shown) which may be included in system 10, for cooling the pump seals and for flushing the seals to prevent solid particles, which may be entrained in the liquid being pumped, from damaging sealing surfaces. Condensate provided by pump 240 to the various mentioned pumps typically flows through the seals and combines with the pumped liquid.

Sufficient acidizing agent is introduced by pump 216 into condensate conduit 88 to substantially prevent the formation of the above-described insoluble materials otherwise caused by combining the condensate with the brine in low pressure crystallizer 56. Typically, sufficient acidizing agent should be introduced into conduit 88 by pump 216 to reduce the pH of the condensate from its natural level of about 9-10 to at least about 7 and sufficient amounts may be added to reduce the condensate pH to about 4.5, which is slightly lower than the typical 5-5.5 pH range of the brine. Such lower level of condensate pH may be required in some instances to offset the elimination of the post-acidizing condensate outgassing step.

Moreover, pH of the steam condensate as it combines with the brine in crystallizer 56 has been found to affect the silica crystallizing processes in flash crystallization stage 52, the amount of silica removed from the geothermal brine being ideally just that amount which prevents any substantial scaling of downstream equipment. Size of the silica precipitate particles formed in flash crystallization stage 52 is important to amount of silica removed and its removal rate. As particle sizes increase, less surface area per precipitate volume is provided. Since in the silica removal process silica crystallization from the flashed geothermal brine onto seed particles depends upon surface area of the particles, the formation of large particles inhibits the silica removal process. On the other hand, if the particles formed are too small, precipitation thereof may not occur and the particles may be carried over into, and cause clogging of, media filters 136 and 138.

As a result, it has been found possible to "fine tune" the silica crystallization process in crystallization stage 52 by adjusting the acidizing of the steam condensate while maintaining the condensate pH between about 7 and about 4.5. Such fine tuning of the silica crystallization process may, for example, be important to accommodate fluctuations over time in brine characteristics.

Monitoring the size of particles flowing with the geothermal brine into clarifier 100, therefore, permits determining the extent to which the steam condensate should, within the above-expressed approximate limits, be acidified. It is found, for example, for a particularly exemplary brine, that mean particle size of clarifier 100 is preferably between about 9 to about 15 microns for good silica crystalliation, and acidification of the steam condensate is adjusted so as to maintain such a mean particle size. If the mean particle size falls below the preferred range, acidifying of the condensate is increased and if the mean particle size increases appreciably over the desired range, the acidifying of the condensate is decreased.

According to a preferred embodiment, pH of the steam condensate is reduced by the addition of an acidifying agent provided by pump 216, through conduits 218 and 220 from storage tank 222. Preferably the acidifying agent is hydrochloric acid because of its low cost, ready availability and effectiveness in reducing condensate pH. Other acids, such as acetic acid or acetic acid derivatives, can alternatively be used. Use of sulphuric acid to acidize the steam condensate has been found to cause formation of additional solids and use of nitric acid has been found to cause corrosion problems in the system; hence, use of these acids is not preferred.

The present invention may be further described with reference to the following example:

EXAMPLE

A sample of flashed geothermal brine is extracted from a geothermal brine clarifier corresponding generally to clarifier 100, ferric ($Fe^{+3}$) ion concentration in the brine samples is measured and are found to be between about 7 and about 13 ppm. Normal pH of the brine sample is about 5.5. The brine sample is heated by an oil bath to a temperature of about 220° F., which is approximately the temperature of the brine in the clarifier.

Samples of steam condensate, as returned from power generating facility 72 or the equivalent thereof, are obtained. Nominal pH of the condensate samples is about 8.6.

A sample of such steam condensate is contacted with hydrochloric acid to reduce the pH thereof to a level of about 7.0. Another sample of the steam condensate is contacted with hydrochloric acid to reduce the pH thereof to about 5.5.

Samples of the 8.6, 7.0 and 5.5 pH condensate, having temperatures of about 90°–100° F., which is about the normal temperature of condensate at the brine combination point (in low pressure flash crystallizer 56), are individually combined and mixed with samples of the approximate 220° F. flashed brine so as to provide various weight percentages of condensate and brine in the mixture. The acidized condensate samples are not permitted to outgas before being combined with the samples of brine. The mixtures are agitated for about an hour, which approximates the average brine transit time from low pressure flash crystallizer through reinjection by wells 210 and 212. Thereafter, ferric ion concentrations in each of the samples are measured and are expressed in percentages of the original amounts (7–13 ppm) of ferric ions in the brine.

Calculations are also made as to the percentages of the original amounts of ferric ions based only upon the amount of dilution provided by the combined amounts of condensate. The results obtained for brine/condensate percent mixtures of 90/10, 80/20, 70/30, 60/40 and 50/50 are tabulated in the following table, (a percent mixture ratio of about 88/12 brine/condensate is typical in above-described system 10).

| % composition of mixture by weight | | Condensate pH (8.6 = normal) | Suspended solids in mixture as % of solids in brine only | Calculated amount of suspended solids in mixture as percent of solids in brine only as a result of dilution only. |
|---|---|---|---|---|
| Brine | Condensate | | | |
| 90 | 10 | 8.6 | 111 | 90 |
|  |  | 7.0 | 93 |  |
|  |  | 5.5 | 75 |  |
| 80 | 20 | 8.6 | 110 | 80 |
|  |  | 7.0 | 88 |  |
|  |  | 5.5 | 85 |  |
| 70 | 30 | 8.6 | 108 | 70 |
|  |  | 7.0 | 83 |  |
|  |  | 5.5 | 66 |  |
| 60 | 40 | 8.6 | 110 | 60 |
|  |  | 7.0 | 75 |  |
|  |  | 5.5 | 53 |  |
| 50 | 50 | 8.6 | 122 | 50 |
|  |  | 7.0 | 68 |  |
|  |  | 5.5 | 40 |  |

The above table shows, for example, for a 90/10% brine/condensate mixture, the expected (calculated) amount of solids (as determined from ferric ion concentration measurements) due to brine dilution is about 90% of the original concentration of solids in brine. However, combining unacidified brine at a pH of about 8.6 causes the amount of solids to be about 110% that of solids initially in the brine and is about 21% higher than that calculated for the diluted brine. For a condensate pH of about 7.0, the percent of solids is found to be about 93% of the amount initially in the brine and is only about 3% higher than that calculated for the diluted brine. For a condensate pH of about 5.5, the percent of solids is found to be about 75% of the initial amount, and is about 15% lower than that calculated for the diluted brine.

Accordingly, for the 90/10% samples, the combining of untreated condensate (pH about 8.6) with the brine causes substantial production of solids, whereas, the combining of acid-treated condensate having a pH of about 7 causes only slight production of solids. The combining of acid-treated condensate having a pH of about 5.5 actually causes a reduction in the expected amount of solids, indicating that a dissolving of preexisting solids occurs at such condensate pH.

The table shows similar results for the 80/70%, 70/30%, 60/40% and 50/50% brine/condensate mixture.

Although a particular embodiment of the invention has been described, it will, of course, be understood that the invention is not limited thereto, since many obvious modifications can be made, and it is intended to include within this invention any such modifications as fall within the scope of the claims.

Having now described the invention, we claim:

1. A method of combining condensate of geothermally derived steam with a flow of geothermal liquid containing water and impurities, said geothermal liquid having an acidic pH, said condensate having a basic pH and containing water and volatile impurities, the impurities in said geothermal liquid and said condensate being such that, if the liquid and condensate are combined without treatment, suspended particulate matter would form in the mixture as a result of reaction between said geothermal liquid impurities and said condensate volatile impurities, said method comprising reducing the formation of said suspended particulate matter by the steps of:
(a) treating the steam condensate to reduce the pH thereof to no more than about 7; and
(b) combining the acidified condensate with the flow of geothermal liquid.

2. The method as claimed in claim 1 wherein the step of treating the flow of steam condensate to reduce the pH thereof comprises contacting the flow of steam condensate with an acidifying agent.

3. The method as claimed in claim 2 wherein the step of contacting the flow of steam condensate with an acidifying agent includes mixing with the flow of steam condensate an acid selected from the group consisting of hydrochloric acid, acetic acid, and acetic acid derivatives.

4. The method as claimed in claim 1 wherein the impurities in said geothermal liquid include silica, wherein said steam is extracted from said geothermal liquid in a flash crystallization stage in which the flow of geothermal liquid is contacted with particulate seed material for causing the crystallization of silica from the geothermal liquid onto said seed material, and wherein the step of combining the acidified steam condensate with the flow of geothermal liquid includes combining the acidified steam condensate into the flow of geothermal liquid in said flash crystallization stage.

5. The method as claimed in claim 1 wherein the step of combining the steam condensate with the flow of geothermal liquid includes flowing at least some of the acidized condensate through seal regions of pumps used to pump said liquid to thereby cool and flush said seal regions.

6. A method of combining condensate of geothermally derived steam with a flow of geothermal liquid, comprising water and impurities, from which said geothermal steam is extracted, and condensate having impurities including ammonia, hydrogen sulfide and carbonates and having a basic pH, said geothermal liquid having impurities including heavy metals, iron, calcium and silica and having an acidic pH, the impurities in the geothermal liquid and in the condensate being such that if the liquid and condensate are combined without treatment, suspended particulate matter, including heavy metal sulfides, calcium carbonate and iron hydroxide would form in the mixture as a result of reaction between the impurities in the geothermal liquid and the impurities in the condensate, said method comprising the steps of:
(a) contacting the steam condensate with an acidifying agent so as to reduce the pH of said condensate to a level of between about 7 and about 4.5; and,
(b) combining the acidified steam condensate with the flow of geothermal liquid in a flash crystallizing stage in which steam is extracted from said geothermal liquid and in which said geothermal liquid is contacted with seed material to cause removal of silica from said liquid.

7. The method as claimed in claim 6 wherein the geothermal liquid and the steam are used in a geothermal power generating system employing a plurality of liquid pumps, including the step of flowing part of the acidified steam condensate to at least some of said pumps for the purging of seals thereof, the steam condensate so used being combined in the pumps with liquid being pumped therethrough.

8. The method as claimed in claim 6 wherein the step of contacting the steam condensate with an acidifying agent includes mixing with said steam condensate an acid selected from the group consisting of hydrochloric acid, acetic acid and acetic acid derivatives.

9. The method as claimed in claim 6 including the step of measuring the size of silica particles formed by the silica seeding process and wherein the step of contacting the steam condensate with an acidifying agent includes adjusting the amount of acidifying agent used within the condensate pH range of between about 7 and about 4.5 as required to maintain the mean size of said silica particles within a preselected range.

10. The method as claimed in claim 9 wherein said preselected particle size range is between about 9 and about 15 microns.

11. A method of combining condensate of geothermally derived steam with a flow of silica-rich, acidic geothermal brine from which the steam is extracted by flashing the brine, said brine having a basic pH and containing impurities in solution, said condensate having impurities carried over from the brine in the flashing process, the impurities in the geothermal brine and the condensate being such that if the brine and condensate are combined without treatment, suspended particulate matter would form as a result of reaction between said brine impurities and said condensate impurities, said method comprising the steps of:
(a) adding an amount of acidifying agent to the flow of condensate causing the pH thereof to be reduced to a level of between about 7 and about the pH level of the geothermal brine with which the condensate is being combined;
(b) combining the acidified steam condensate with the geothermal brine in a flash crystallization stage in which the flow of flashed brine is contacted with seed material onto which silica from the brine is crystallized to form a precipitate; and,
(c) monitoring the size of particles in said precipitate and adjusting the amount of acidifying agent added to the steam condensate so as to maintain the mean size of said particles within a preselected range.

12. The method as claimed in claim 11, wherein said preselected range of mean particle size has a lower level of about 9 microns.

13. The method as claimed in claim 11 wherein the steam condensate is acidified to a pH level of between about 7 and about 4.5.

14. The method as claimed in claim 11 wherein the acidifing agent is in acid selected from the group consisting of hydrochloric acid, acetic acid and acetic acid derivatives.

15. The method as claimed in claim 14 wherein the acid selected is hydrochloric acid.

16. The method as claimed in claim 11 where the preselected mean particle size is between about 9 and about 15 microns.

17. The method as claimed in claim 11 wherein the geothermal brine is used in a geothermal brine power generating system having a plurality of pumps for pumping the brine from one stage to another stage, including the step of flowing at least some of the acidified steam condensate to seals of at least some of said pumps for cooling said seals and for flushing the pump seals to prevent damage by particulate matter in the brine being pumped, said condensate flowing through said seals and being combined with the brine being pumped therethrough, scaling in the pumps being also thereby inhibited.

18. In a facility for producing steam from a flow of silica-rich, naturally pressurized geothermal brine having volatile impurities, including ammonia, hydrogen sulfide and carbon dioxide, and having non-volatile impurities, including heavy metals, iron and calcium, the facility having high and low pressure flash crystallizers in which some of the steam is converted to steam and in which the flashed brine is contacted with seed crystals onto which silica deposits from the brine as the flashed brine becomes supersaturated in silica, having a reactor-clarifier stage in which the deposited silica is separated from the brine, and having a filtering stage for filtering clarified brine discharged from the reactor-clarifier stage, a method for combining with the flashed brine condensate from said steam, the condensate being basic and containing some of said volatile impurities which tend to react with said non-volatile impurities in the flashed brine to form fine, insoluble particles which are difficult to separate from the brine in the reactor-clarifier stage, and which, therefore, flow with the brine into the filtering stage, the method of combining the condensate with the brine comprising:

(a) reducing the pH of the steam condensate to between about 7 and about 4.5 by contacting the condensate with an acidifying agent; and (b) combining the reduced pH, steam condensate with the flashed brine in the low pressure flash crystallizer.

19. The method as claimed in claim 6, including the step of mixing the acidifying agent with the steam condensate so as to enhance contact therebetween.

20. The method as claimed in claim 11, including the step of mixing the acidifying agent with the steam condensate so as to enhance contact therebetween.

21. The method as claimed in claim 18, including the step of mixing the acidifying agent with the steam condensate so as to enhance contact therebetween.

* * * * *

UNITED STATES PATENT AND TRADEMARK OFFICE
CERTIFICATE OF CORRECTION

PATENT NO. : 4,615,808

DATED : October 7, 1986

INVENTOR(S) : Darrell L. Gallup and John L. Featherstone

It is certified that error appears in the above-identified patent and that said Letters Patent is hereby corrected as shown below:

On the title page insert:

[*] NOTICE: The portion of the terms of this patent subsequent to June 11, 2002 has been disclaimed.

Signed and Sealed this

Sixth Day of January, 1987

*Attest:*

DONALD J. QUIGG

*Attesting Officer*     *Commissioner of Patents and Trademarks*